(12) United States Patent
Van Phan et al.

(10) Patent No.: US 9,232,393 B2
(45) Date of Patent: Jan. 5, 2016

(54) FACILITATING PROXIMITY SERVICES

(75) Inventors: Vinh Van Phan, Oulu (FI); Ling Yu, Oulu (FI); Kari Veikko Horneman, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/401,618

(22) PCT Filed: May 18, 2012

(86) PCT No.: PCT/EP2012/059309
§ 371 (c)(1),
(2), (4) Date: Nov. 17, 2014

(87) PCT Pub. No.: WO2013/170904
PCT Pub. Date: Nov. 21, 2013

(65) Prior Publication Data
US 2015/0133083 A1    May 14, 2015

(51) Int. Cl.
*H04W 12/04* (2009.01)
*H04L 29/06* (2006.01)
*H04W 4/00* (2009.01)
*H04W 4/02* (2009.01)
*H04W 4/20* (2009.01)
*G06Q 30/02* (2012.01)
*H04W 76/02* (2009.01)
*H04M 3/487* (2006.01)

(52) U.S. Cl.
CPC ........... *H04W 12/04* (2013.01); *G06Q 30/0267* (2013.01); *H04L 63/068* (2013.01); *H04W 4/008* (2013.01); *H04W 4/02* (2013.01); *H04W 4/021* (2013.01); *H04W 4/206* (2013.01); *H04W 76/023* (2013.01); *H04M 3/4878* (2013.01)

(58) Field of Classification Search
None
See application file for complete search history.

(56) References Cited

U.S. PATENT DOCUMENTS

| | | | |
|---|---|---|---|
| 7,856,373 B2* | 12/2010 | Ullah | G06Q 30/02 705/14.4 |
| 9,113,395 B2* | 8/2015 | Van Phan | H04W 48/12 |
| 2007/0136476 A1 | 6/2007 | Rubinstein | |
| 2011/0035284 A1* | 2/2011 | Moshfeghi | G06Q 30/02 705/14.58 |
| 2012/0047558 A1 | 2/2012 | Sundaram et al. | |
| 2012/0066495 A1* | 3/2012 | Hao | H04L 9/0827 713/168 |

(Continued)

OTHER PUBLICATIONS

International Search Report and Written Opinion for International Application No. PCT/EP2012/059309, mailed Apr. 2, 2014, 11 pages.

*Primary Examiner* — Ashish K Thomas
(74) *Attorney, Agent, or Firm* — Brake Hughes Bellermann LLP

(57) ABSTRACT

There is provided a method, comprising: establishing, by a first network node, a communication connection to at least one advertising device located in a geographically limited service area; establishing a communication connection to at least one advertisement-receiving device; generating at least one security key for encrypting and decrypting at least part of the data which is to be transmitted in D2D communication links, wherein each security key is valid for a predetermined validity period, and common to those at least one advertising device and at least one advertisement-receiving device within the service area which fulfill predetermined criteria; causing transmission of information indicating the generated at least one security key to those at least one advertising device which fulfill the predetermined criteria; and causing transmission of information indicating at least one of the generated at least one security key to those at least one advertisement-receiving device which fulfill the predetermined criteria.

26 Claims, 5 Drawing Sheets

(56) References Cited

U.S. PATENT DOCUMENTS

| | | | |
|---|---|---|---|
| 2012/0096490 A1* | 4/2012 | Barnes, Jr. | G06Q 10/02 725/34 |
| 2012/0102315 A1* | 4/2012 | Holtmanns | H04L 63/06 713/150 |
| 2012/0143713 A1* | 6/2012 | Dittus | G06Q 30/08 705/26.3 |

* cited by examiner

FACILITATING PROXIMITY SERVICES

This application is a national stage entry of PCT Application No. PCT/EP2012/059309, filed on May 18,2012 entitled "FACILITATING PROXIMITY SERVICES", which is hereby incorporated by reference in its entirety.

FIELD

The invention relates generally to mobile communication networks. More particularly, the invention relates to facilitating proximity services and, in particular, enabling reliable local device-to-device (D2D) advertising.

BACKGROUND

It is foreseen that user terminals, which are carried by users located in a specific area, may receive advertisements from other devices in the area. The advertisements may be transmitted to the user terminal via a device-to-device (D2D) communication. This advertisement between two closely located devices may be seen as part of proximity based services (ProSe). Key issues in such D2D based local hyper-advertising services of ProSe may include, for example, security and reliability.

BRIEF DESCRIPTION OF THE INVENTION

According to an aspect of the invention, there are provided methods as specified in claims 1, 9 and 12.

According to an aspect of the invention, there are provided apparatuses as specified in claims 14, 22, 25 and 27.

According to an aspect of the invention, there is provided a computer program product as specified in claim 28.

According to an aspect of the invention, there is provided a computer-readable distribution medium carrying the above-mentioned computer program product.

According to an aspect of the invention, there is provided an apparatus comprising processing means configured to cause the apparatus to perform any of the embodiments as described in the appended claims.

According to an aspect of the invention, there is provided an apparatus comprising a processing system configured to cause the apparatus to perform any of the embodiments as described in the appended claims.

According to an aspect of the invention, there is provided an apparatus comprising means for performing any of the embodiments as described in the appended claims.

Embodiments of the invention are defined in the dependent claims.

LIST OF DRAWINGS

In the following, the invention will be described in greater detail with reference to the embodiments and the accompanying drawings, in which FIG. 1 presents a cellular communication network, according to an embodiment;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a radio network controller. a Node B, or an evolved Node B, for example), at least one user equipment (UE) (also called a user terminal, terminal device or a mobile station, for example) and optional network elements that provide the interconnection towards the core network. The base station may be node B (NB) as in the LTE, evolved node B (eNB) as in the LTE-A, a radio network controller (RNC) as in the UMTS, a base station controller (BSC) as in the GSM/GERAN, or any other apparatus capable of controlling radio communication and managing radio resources within a cell.

The base station may connect the UEs via the so-called radio interface to the network. In general, a base station may be configured to provide communication services according to at least one of the following radio access technologies (RATs): Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), LTE, and/or LTE-A. The present embodiments are not, however, limited to these protocols.

Figure 1:
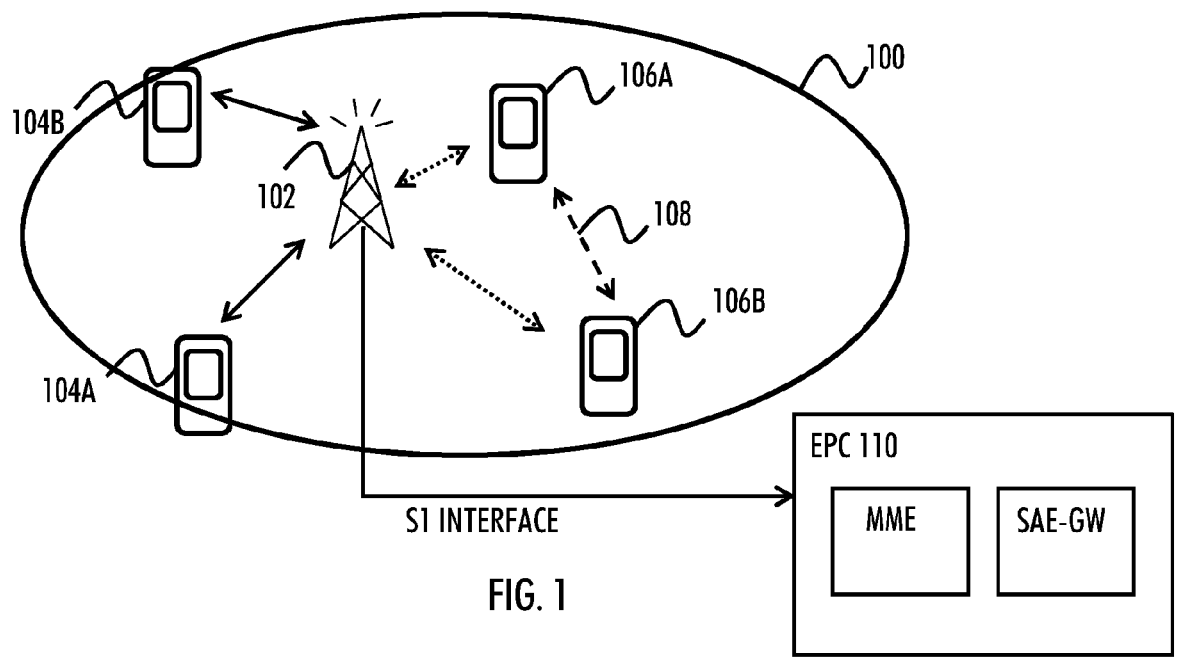

FIG. 1 shows a communication network where embodiments of the invention may be applicable. A base station 102 may be used in order to provide radio coverage to the cell 100. For the sake of simplicity of the description, let us assume that the base station is an eNB. In the case of multiple eNBs in the communication network, the eNBs may be connected to each other with an X2 interface, as specified in the LTE. The eNB 102 may be further connected via an 51 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, evolved-UMTS terrestrial radio access network (E-UTRAN) or LTE idle mode packet buffering, etc.

Still referring to FIG. 1, the eNB 102 may control a cellular radio communication links established between the eNB 102 and each of terminal devices 104A and 104B located within the cell 100. These communication links marked with solid arrows may be referred as conventional communication links or as cellular communication links for an end-to-end communication, where the source device transmits data to the destination device via the eNB 102. Therefore, the user terminals 104A and 104B may communicate with each other via the eNB 102. The terminal device may be a terminal device of a cellular communication system, e.g. a computer (PC), a sensor, a laptop, a palm computer, a mobile phone, or any other user terminal (UT) or user equipment (UE) capable of communicating with the cellular communication network.

In addition to or instead of conventional communication links, direct device-to-device (D2D), also known as mobile-to-mobile (M2M), terminal-to-terminal (T2T), peer-to-peer (P2P), connections may be established among terminal devices, such as terminal devices 106A and 106B. The D2D communication may be integrated into the cellular network, such as the LTE/LTE-A cellular network. The integration may denote that devices (or mobile or terminals or peers or machines) 106A and 106B having a direct physical communication link utilize the radio resources of the cellular network, thus sharing the cellular network resources of the licensed band with other devices 104A, 104B having the conventional cellular communication to the eNB 102.

Terminal devices that have established a radio resource control (RRC) connection with the eNB 102 may have their D2D communication links 108 controlled by the eNB 102 as shown with dotted arrows in FIG. 1. The control of a direct D2D communication link 108 may be carried out when an associated terminal device is either in an RRC idle state or in an RRC connected state. Thus, the eNB 102 may be responsible for allocating radio resources to the direct communication link 108 as well as for the conventional communication links. For examples, the D2D UT 106A may apply the cellular uplink (UL) or downlink (DL) resources in communication of data with the D2D UT 106B, and vice versa. The purpose of establishing a direct communication into the cellular network may be the possibility to reduce transmitter power and resource consumption both in the user terminals (UTs) and in the eNB 102 (or any base station), increase the cellular network resource utility and capacity, and establishing more services for the users.

Figure 2:
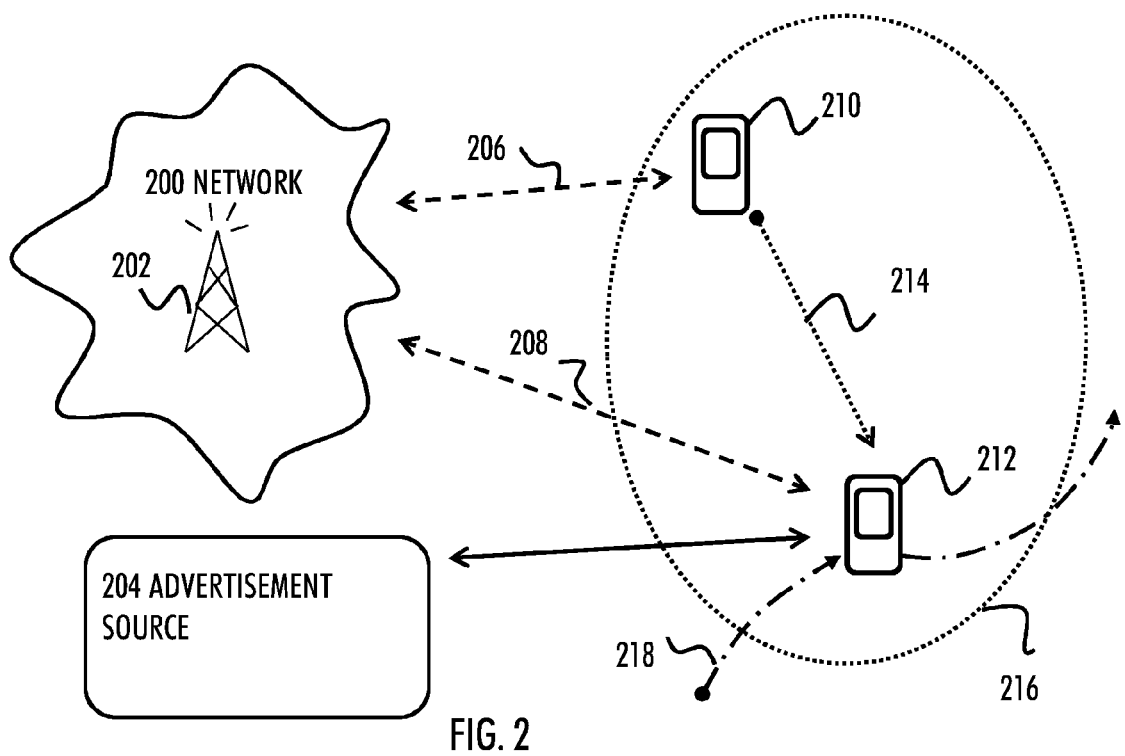
FIGS. 2, 4 and 5 show scenarios applicable for advertisement service, according to some embodiments.

As said, such D2D communication may be applied in proximity services (ProSe). One possible service type is the local advertising (or local hyper-advertising) scenario, where a receiving device 212, as shown in FIG. 2, may receive advertisements from the advertising device 210 through D2D communication 214. The applied D2D communication may refer to dedicated D2D communication links between devices or to multicast/broadcast D2D communication between one transmitter (e.g. the advertising device 210) and at least one recipient (e.g. the advertisement-receiving device 212) without establishment of dedicated links. One possible use scenario may be imagined as follows: A restaurant owner decides to apply local hyper-advertisement service through his proximity aware communication device 210 in order to transmit information of current offers to potential customers passing by the restaurant. These potential customers are assumed to carry devices 212 capable of D2D communication. As the potential customer is passing by the proximity of the shop, or a serving area 216 in this example, as shown with dot-dashed arrow 218, the advertising device 210 and the advertisement-receiving device 212 may establish a D2D communication connection 214 and the device 210 may transmit advertisements to the device 212 through the D2D communication connection 214. It may further be that the user of the advertisement-receiving device 212 is allowed to accept the local hyper-advertisement services and to establish direct communication links 214 with another device. If such is not enabled by the device 212, the device 212 may not be able to receive any advertisement messages directly from the advertising device 210.

The user may then notice the advertisement message popping up on the device 212. Based on the content of the advertisement message, the user may decide to opt out from receiving advertisements from this specific advertising device 210, or to respond to the advertisement message either directly to the advertisement source 204 or via the advertising device 210. It is to be noted that the advertisement source 204 may be the same as or different from the advertising device 210. The respond may be a phone call, a data transfer, etc., such as "Please reserve a table for two persons at 5 o'clock p.m." Alternative respond may be to physically enter the restaurant without any respond messages being sent.

Key issues in such D2D based local hyper-advertising services of ProSe may include, for example, abilities and capabilities of serving networks 200 in supporting: (i) hundreds of local advertising sources 204 or 210 (devices of local restaurants, shops, play stations, e-service machines, etc.) all wanted to be discovered by thousands of potential receiving ends 212 (devices of customers walking or being around); and (ii) possibilities for the receiving ends 212 to choose to receive only what and when they want and then to interact or communicate with selected sources of interest, all in a cheap, fast, easy, spectral- and energy efficient manner. It may also be important that controlling network 200 is capable of preventing any misuse of D2D users 210, 212 when conducting radio communications on the licensed band. In this regard, it may be important to prevent unauthorized or unauthenticated D2D devices to autonomously start advertising or listening to advertisement on licensed band without permission.

Figure 3:
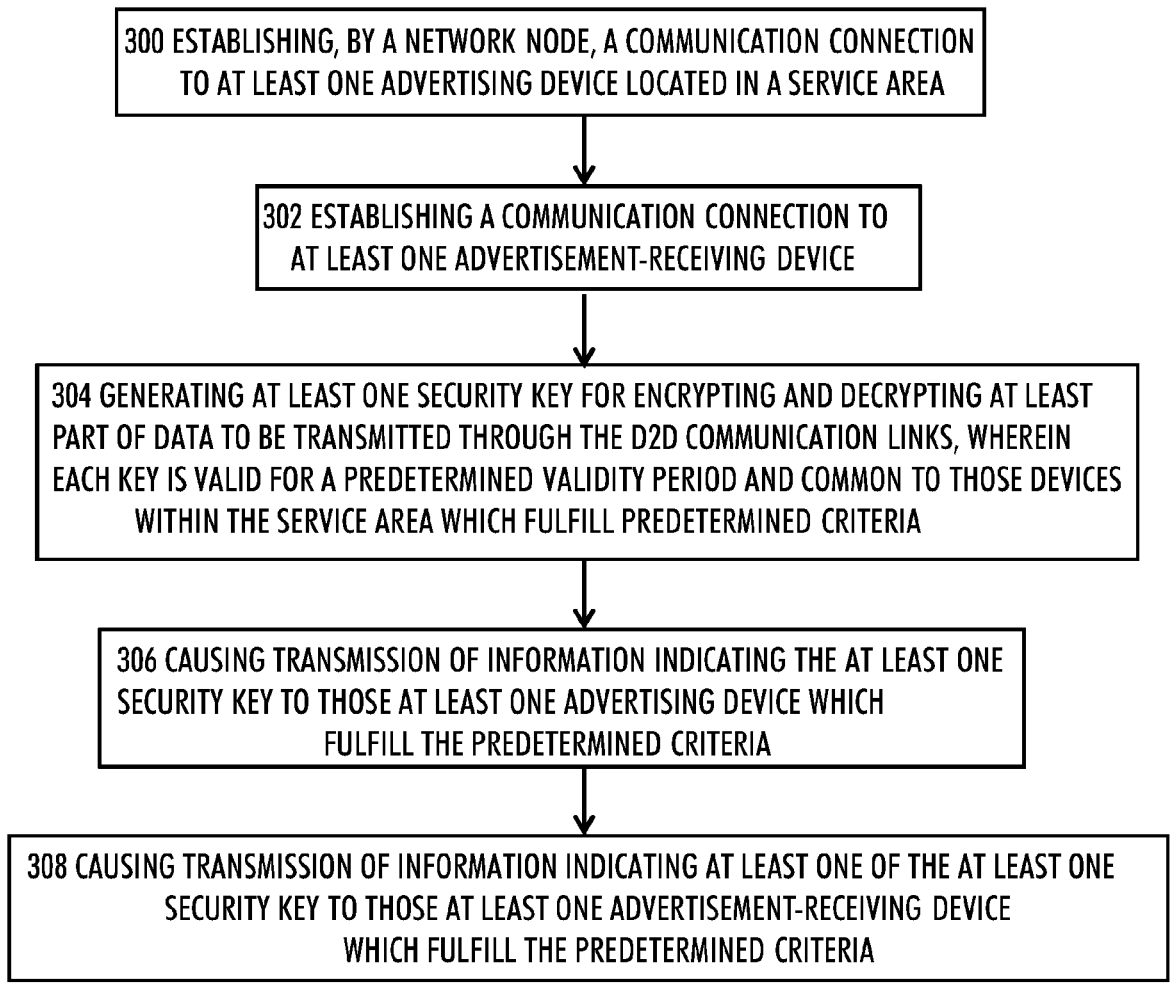
FIGS. 3, 7 and 8 show methods, according to some embodiments.

Therefore, it is proposed, as shown in FIGS. 2 and 3, that the network node 202 (such as eNB) is establishing, in step 300, a communication connection 206 to at least one advertising device 210 located in a geographically limited service area 216 within which advertisements are transmitted from the at least one advertising device (AD) 210 to at least one advertisement-receiving device (ARD) 212 through direct device-to-device (D2D) communication links 214. The D2D communication may refer to dedicated D2D links, to D2D multicasting and/or to D2D broadcasting. It is to be noted that the AD 210 may typically be a stationary device within the service area 216. It may be, for example, a cellular device capable of D2D communication at a restaurant premises. The node 202 of the cellular communication network may connect to the AD 210 in any means known to a skilled person. The node 202 may provide coverage to the service area 216, e.g. the coverage area of the network node 202 may cover at least the service area 216 of interest.

Similarly, in step 302, the node 202 may establish a connection 208 to at least one ARD 212, which may be portable device moving or staying still within the service area 216. The node 202 may also detect the presence of the at least one ARD 212 in the area by means of location updates of the ARD 202. The ARD 212 may be cellular mobile phone carried by a user. The location updates may be based on tracking areas of the LTE-A, for example. These links 206 and 208 may be applied by the network 200 also in order to provide control information to the AD 210 and to the ARD 212 so that the devices may later apply the direct D2D communication. In an embodiment, the node 202 may also detect when the advertisement-receiving device 212 leaves the service area 216 on the basis of location updates from the advertisement-receiving device 212.

In an embodiment, the at least one ARD 212 may transmit and the node 202 may receive an activation request, wherein the activation request is for receiving advertisements from at least one advertising device 210 in the service area 216. The request may be sent via the established communication connection 208. That is, the ARD 212 upon initiating to receive certain local advertising service may first need to request a service (re)activation from the serving network 200. The serving network 200 may be the network provided by the operator of the ARD 212. The request may be an activation request or a reactivation request, in case the user of the ARD 212 has applied the local advertisement service before, but is not currently using it. The previous usage of the service may be in different service area, for example.

Consequently, the node 202 may determine whether to accept the request or not. The determination may be based on predefined rules, such as is the requesting device in the same service area, is it served by a certain operator, for example, as will be described later. Also the history information regarding the requesting ARD 212 may be taken into consideration. For example, if it is detected, based on the history file, that the requesting ARD 212, or the AD 210 to which the request refers to, is known to misbehave (such as transmitting false advertisements), the request may be rejected. Thereafter, upon accepting the request, the node 202 may cause transmission of information to the at least one advertisement-receiving device, wherein the information indicates control information for enabling the D2D communication with the at least one advertising device. Such use of activation request to receive advertisements from a specific AD 210, may advantageously enable an authorized advertisement-receiving device 212 to facilitate in authentication of the specific active advertising device 210.

It should be noted that there may be a plurality of service areas and the size of each service area may vary from another. The size may be defined by the coverage area of the D2D communication link 214. Thus, applying more transmit power for the D2D link 214, the size of the corresponding service area 216 may be extended. Also adding new ADs 210 to the area may enlarge the service area, depending on the content of the advertisements from the new advertising devices. Therefore, the size of each serving area may be predetermined.

In step 304, the node 202 may generate at least one security key for encrypting and decrypting at least part of data which is to be transmitted through the D2D communication links 214. Each security key may be valid for a predetermined validity period. The security key may be seen as a common authentication-enhanced security key which is provided by the serving network to the advertising device 210 and to the advertisement-receiving device 212. The proposed common security key may be then used for ciphering some part of broadcast common control information by authentic sending devices 210 which information the receiving device 212 may first need to receive in order to select and access any individual sending devices 210 for any actual advertisements of interest. However, the security key(s) may not be common to all devices. It may be that the security key(s) is/are common only to those devices 210/212 within the service area which fulfill predetermined criteria. The predetermined criteria is discussed later.

It is to be noted that the security key is valid only for a predetermined amount of time, i.e. during a corresponding validity period. In an embodiment, the length of the validity period may vary for different security keys, whereas in another embodiment, the validity period is the same for all generated security keys. Having the same validity period may be advantageous so that only one security key update interval is needed to be communicated. This may reduce the signaling overhead, for example, and simplify the service configuration.

In an embodiment, the node 202 may generate only one security key at a time, each generated key corresponding to the current validity period. In another embodiment, the node 202 may generate several security keys at once. The security key(s) may be generated based on a predetermined rule or predetermined rules. The details of generating such ciphering key are not disclosed here because they are known by a skilled person.

Furthermore, in an embodiment, the at least one security key may be specific with respect to at least one of the following: the service area 216, an operator, and service type, wherein the operator refers to the network provider for a given node or device and the service type refers to the type of service being received by the advertisement-receiving device.

As said, in an embodiment, the security key may be a service area—specific. The service area—specific may denote that the key is common to all devices 210/212 within the service area 216, but not valid outside the service area 216. For example, when the person with device 212 leaves the area, the earlier received security (or ciphering) key may not be valid elsewhere.

In an embodiment, the security key is, additionally or instead, service specific in order to allow only certain type of advertisements to be decrypted by using the security key. In this case the key may be common, within the service area, to only those advertisement-receiving devices 212 which want to listen to only specific kind of advertisements (such as advertisements of restaurants, but not advertisements of clothes, for example) and to those advertising devices 210 which advertise, for example, restaurants. This may be advantageous so that the service types may be separated from each other. It should be noted that the term "service type" may have different kinds of classifications: 1) restaurant/clothing/electronics/music/movies/cars, for example, 2) age sensitive: common/children/adult, etc., for example, and 3) advertisement services, other possible proximity based services, for example.

In an embodiment, the generated security key is, additionally or instead, operator specific. Thus, one security key is common only to those devices 210 and 212 which are served by a certain operator. For devices served by another operator, the same common key may not work. This may be advantageous in order to separate services provided by different operators.

Figure 4:
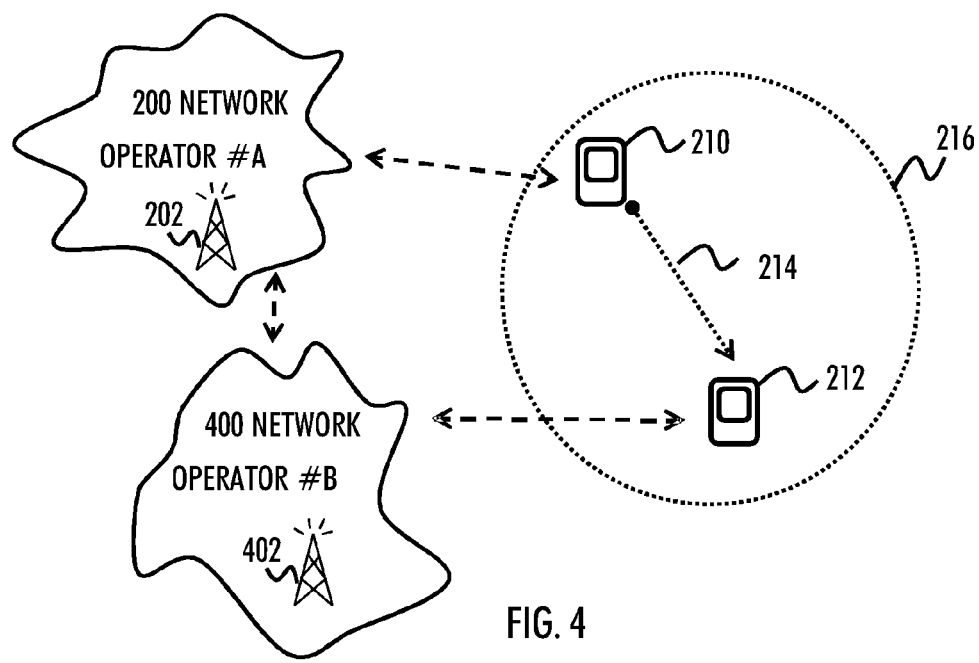

In another embodiment, as shown in FIG. 4, the node 202 of the network 200 may agree with a second network node 402, which is associated with another network operator #B than the first network node 202 (for example, the operator of network 200 may be an operator #A, as shown in FIG. 4), that the generated at least one security key is valid for each advertising device 210 and advertisement-receiving device 212 in the service area 216 regardless of whether the serving operator is #A or #B. That is, even when some devices (such as the AD 210) are served by the network 200 and some (such as the ARD 212) are served by the network 400, all devices 210 and 212 share the same at least one security key regardless of the operator. I.e. a type of multi-operator service may be established because different operators which provide such advertising services over overlapping or same service area may agree upon using the same specific security key toward end-users, regardless of their subscribed operators.

Thus, the common key, either service area-specific regardless of operators, operator-specific, service specific, or any possible combination thereof, may initially be used as means of authentication for both receiving 212 and sending 210 ends. Now, as said before, the security key(s) may be common to only those devices which fulfill the predetermined criteria. Consequently, in an embodiment, the predetermined criteria may require at least one of the following: the device is within a certain service area, the device is served by a certain operator, the device is applying a certain type of service. Which predetermined criteria to apply by the node 202, may depend on the specificity of the at least one security key. That is, if the security key is only service area-specific, the security key may be common to all devices in the service area 216 regardless of the serving operator, for example. If the security key is operator specific, the security key may be common to all devices served by a certain operator. If the security key is service type-specific, the security key may be common to all devices applying the certain service, such as the ProSe local hyper advertisement services. As appreciated by a skilled person, any combination of the predetermined criteria is possible. In an embodiment, the node 202 may determine the predetermined criteria itself or receive the information indicating the criteria to be applied from the provider of the network 200.

Owing to the characteristics of such common security key(s), practically real-time authentication and authorization control and management of both the at least one advertising device 210 and the at least one advertisement-receiving device 212 may be enabled. Further, the use of common security key having a certain specificity may prevent any advertisement-receiving device 210 from listening to unauthorized services. That, is the ARD 212 may receive advertisements from only those devices which share the same common key (according to the predetermined criteria). This may advantageously allow the ARD 212 to prevent the reception of advertisements from false or unauthorized ADs 210.

Let us go back to FIGS. 2 and 3, wherein, in step 306, the node 204 may cause transmission of information indicating the at least one security key to those at least one advertising device which fulfill the predetermined criteria. This may take place via the link 206 of FIG. 2. The AD 210 may be in the RRC connected state when they get the security keys from the network 200 via the connection 206. The node 202 may provide all the generated security key(s) to the AD 210. The AD 210 may use the security key(s) to cipher at least some part of device/service access information with the current security key. By current it is meant that the devices need to use a specific (corresponding) security key, wherein the security key to be used is selected by the device (AD 210 and/or ARD 212) on the basis of the current validity period. In this light it may be understood that the validity periods are identifiable by means of a sequential numbering or a timing reference, for example.

The part of the control information that is ciphered with the current security key may mean only certain control information which may be used by the advertisement-receiving device 212 to receive further information and actual advertisements of interest from the advertising device 210. The common key is not necessarily used for ciphering actual advertisements but only the control information in order to indicate the receiving device 212 how to access such advertisements from a selected source. However, in an embodiment, the advertisements themselves may also be ciphered with the current security key. This may be advantageous if sensitive advertisements are applied.

In step 308, the node 202 may cause transmission of information indicating at least one of the at least one security key to those at least one advertisement-receiving device 212 which fulfill the predetermined criteria. The node 202 need not send all of the generated keys to the ARD 212, because the AD 210 may also provide some information regarding the security key(s), as will be explained later. However, in one embodiment, all the generated security key(s) are transmitted to the ARD 212. The transmission of the security key information to the devices 210/212 may take place by any secure and reliable communication known to a skilled person.

In an embodiment, the node 202 may cause transmission of information indicating only the current security key and the security key update interval to the advertisement-receiving device 212. Thus, the node 202 need not send the other generated security key(s) to the ARD 212, but the ARD 212 may receive them from the AD 210 it is listening to, as will be explained later. The update interval may be transmitted because the ARD 210 may use that information to detect when it is time to start using the next security key. This embodiment may be advantageous in order to reduce the signaling overhead between the node 202 and the ARD 212.

The serving network 200, and more specifically, the node 202, may also provide configuration information for discovery and access of at least one local advertising device 210, possibly including those of other operators. It is to be noted that common multi-operator server functionality may be implemented to provide multi-operator information, such as e.g. updated security key, access information, limitation and restriction, etc., for ProSe advertising services.

Figure 5:
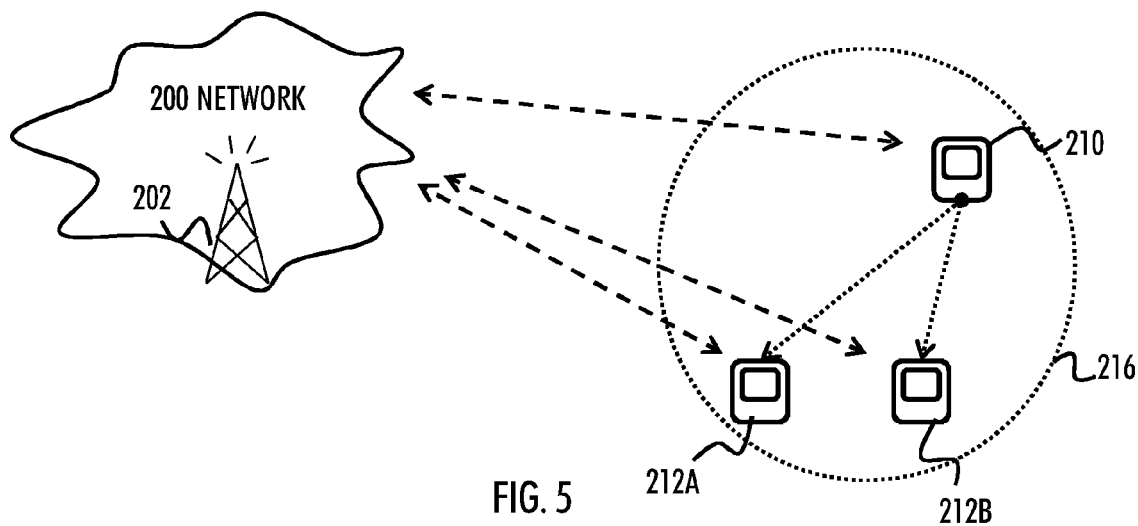

In an embodiment, as shown in FIG. 5, there may be several ARDs 212A and 212B in the service area. Then it may be advantageous to count the number of ARDs 212A, 212B. The node 202 may detect the number of advertisement-receiving devices 212A, 212B in the service area 216 on the basis of the number of received activation requests from the advertisement-receiving devices 212A, 212B, for example. As said, the dashed lines between the network node 202 and the devices 212A, 212B may represent the communication links used for making the request.

In an embodiment, once the security key related information (and possibly the update interval related information) is communicated to the at least one ARD 212, the connection 208 of FIG. 2 may be released. In another embodiment, the node 202 may release the established communication connection 208 to the advertisement- receiving device 212 upon detecting that the D2D communication link 214 is established between the advertisement- receiving device 212 and the advertising device 210. E.g. once the advertisement-receiving device 212 successfully receives all the necessary configuration information for the service reactivation and eventually get access to a selected active advertising device 210 of interest, the serving network 200 may release the cellular connection 208. Thereafter, the devices 210 and 212 may communicate directly with each other, either via dedicated D2D or multicast/broadcast D2D. Note that the advertisement-receiving device 212 may access any active local advertising devices 210 as long as having valid security key(s).

In an embodiment, as shown for example in FIG. 2, the node 202 may receive information via the link 208 transmitted by the advertisement-receiving device 212, wherein the information relates to an advertising device 210 being listened to or discovered by the advertisement-receiving device 212. When performing this, the ARD 212 may be in the cellular RRC connected state. It may be that the connection 208 was not released at all after reception of the required information, or it may be that the connection 208 is re-established. The network node 202 may specifically select at least one of the ARDs 212 in the service area 216 and configure the ARD 212 to report information related to the AD 210 discovered. The information may indicate, for example, the device 210 identity, serving cell ID, geographical location information, etc. The network node 202 may then, on the basis of the received information, determine whether or not the advertising device 210 is a valid (e.g., authenticated and authorized) advertising device. For example, if a wrong security or identity is used by the AD 210, the AD 210 may not be valid. The network node 202 may apply also other information in the determination, such as, for example, information regarding the ARD 212 which reported the data. If the information regarding the ARD 212 indicates that the ARD 212 is not authorized device (such as it does not provide the correct common security key), the network node 202 may discard the report.

In an embodiment, the ARD 212 may transmit and the node 202 may receive information indicating that the advertisement-receiving device 212 is responding to a received advertisement from a specific advertising device 210. Based on this knowledge, the node 202 may identify the specific advertising device 210 and apply the information in, for example, ranking the ADs 210 and for charging of services, for example. In practice, as shown in FIG. 2, this may take place such that when the advertisement-receiving device 210 is initiating a call request to the advertising source 204 detected in the received advertisement, the call request may indicate to the network 200 (to the node 202) or to the access node (e.g. the D2D device) that it is on-the-fly answering to an advertisement received from a particular active advertising device 210. The ARD 212 may send the information directly to the network 200, via the D2D device 210, or via a third access node. This embodiment may enable quick authorizing and serving of the receiving device 212 when the AD 212 contacts the advertising source device 204 of interest based on the recently received advertisement. As said, this information may also be used for charging purposes: the network 200 may charge both the receiving 212 and source 204/210 ends based on service requests and possibly on counting of receiving devices 212 making such contact to the advertisement source 204.

Figure 6:
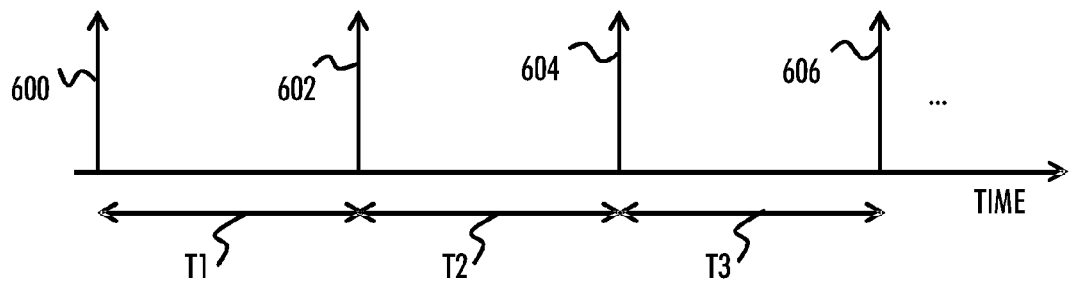
FIG. 6 illustrates a time line with validity periods of security keys, according to an embodiment.

As shown in FIG. 6, the update of the security key from the network node 202 shown with reference numerals 600 to 606 may be frequent, e.g., on a regular basis of every T interval synchronized over at least the service area of interest. (T in range of minutes may be sufficient for the advertising services). Thus, all authenticated and authorized advertising devices 210 (of same operator, applying the same service type, and/or of same service area) may be using the same updated key.

Instead of updating the key from the network 200 every T intervals, in one embodiment, the node 202 may cause transmission of a plurality of security keys and security key update interval at least to the at least one advertising device 210. I.e. the serving network 200 may provide the active advertising devices 210 with keys of several next consecutive T intervals in advance to reduce key-updating signaling overhead. The plurality of security keys may cover a plurality of predetermined validity periods, each security key expiring after a corresponding validity period. This embodiment is illustrated in FIG. 6, where a time line is drawn and shown to comprise several validity periods T1, T2, T3, etc. It may be that the node 202 generates three security keys, one for each validity period. The first key may expire at the end of T1, the second key may expire at the end of T2, and the last key may expire at the end of the interval T3.

In an embodiment, the plurality of security keys and the security key update interval T may be communicated by the node 202 to the advertisement receiving device 212 as well. However, in an embodiment, as said earlier, the node 202 may transmit information indicating only the current security key and the security key update interval to the advertisement-receiving device 212.

In an embodiment, the AD 210, having knowledge of the security keys to be applied for the next few consecutive validity periods T1-T3, may advertise its latest updated security key in a secure fashion (ciphered) to its audience (e.g. the ARDs 212 listening to the AD 210) and, consequently, the audience may get the latest updated security key from the advertising device 212 it is listening to. In an embodiment, the AD 210 may transmit information to the active at least one advertisement-receiving device 212 according to predetermined synchronization, wherein the information indicates an update of the security key for at least one next validity period. The synchronization may be predetermined and known by the ADs 210 and ARDs 212 in the service area, e.g. the active advertising device 210 and the receiving device 212 may be configured to send and receive the updated key to be used for the next T interval in a synchronized fashion, scheduled within the current T interval.

In an embodiment, which may be used instead or additionally, the AD 210 may transmit such information to the at least one advertisement-receiving device during the previous validity period. E.g. the active advertising device 210 may advertise the current key (that is used in the current T interval) ciphered with the previous valid key (that was used in the previous T interval). In other words, the security key to be used in the next validity period may additionally be ciphered with the currently valid security key, which is transmitted from the AD 210 to the ARD 212. This may be advantageous because it may allow the advertisement-receiving device 212 to have more time to get the updated security key and continue listening to the advertisements when moving from one active advertising device to another.

As a result, if the advertisement-receiving device 212, being an active listener, fails to update the key for two consecutive T intervals, then the service may be considered as being deactivated. Consequently, the ARD 212 may have to get access to the serving network 200 to reactivate the advertising service again.

In an embodiment, the next security key is derived from the previous security key. E.g. there may be a known difference between two adjacent security keys, and by knowing the difference, the second security key may be derived from the first security key without explicitly indicating the second security key.

It should be noted that even though the Figures show only one AD 210, there may be several ADs in the service area 216. Then the predetermined criteria, according to which the security key(s) is/are common, may also be adopted to the plurality of ADs as well as to the plurality of ARDs.

In an embodiment, the network node 202 configured each security key to accept only a predetermined number of advertisements. That is, the same security key may be used to receive only certain predetermined number of advertisements.

In an embodiment, the AD 210 may add qualification and/or classification information to the advertisement in order to rank different advertisements. The ARD 212 may extract the qualification and/or classification information from the received advertisement. In an embodiment, the ARD 212 may discard those advertisements which do not match to required qualification and/or classification information, which may be indicated to the ARD 212 by the network node 202, for example. In an embodiment, the security key is configured to be applicable only to advertisements that match predefined requirements set for the security key(s).

In yet another embodiment, the ARD 212 may be configured, by the user, to receive only some sort advertisements which the user is willing to receive.

Figure 7:
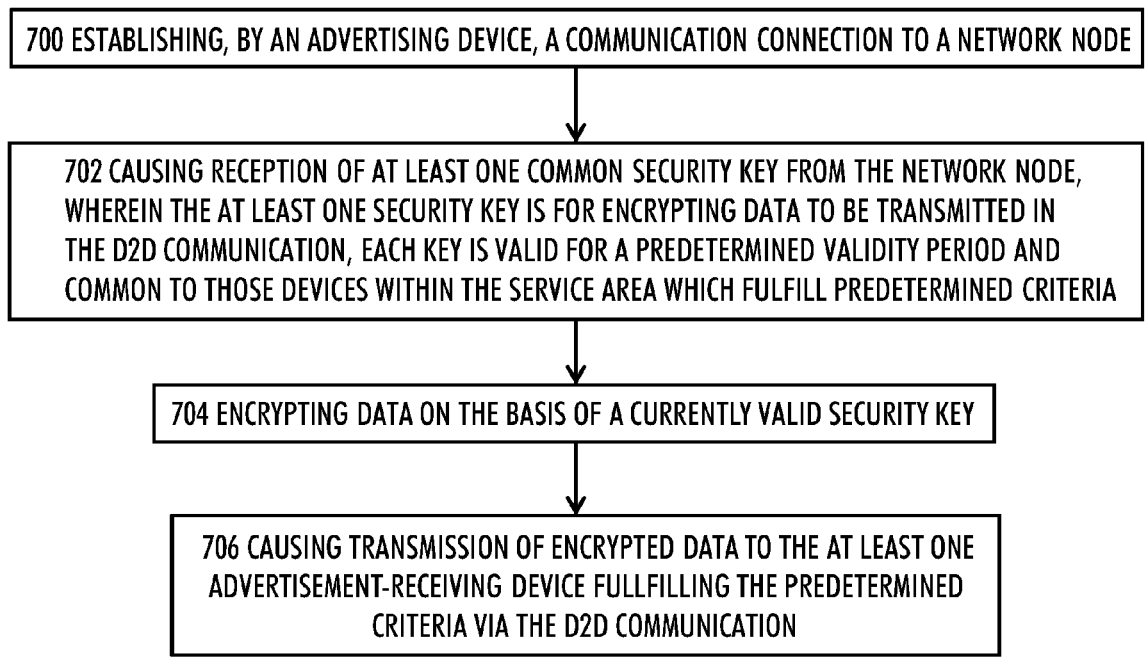

FIG. 7 illustrates a method from the advertising device point of view. The method starts in step 700, wherein the advertising device 210 locating in the service area 216 establishes a communication connection to the network node 202. In step 702, at least one common security key is received from the network node 202. The at least one security key is for encrypting at least part of the data which is to be transmitted through the D2D communication link 214. Each security key may be valid only for a predetermined validity period and common to those at least one advertising device and at least one advertisement-receiving device within the service area 216 which fulfill the predetermined criteria, as explained earlier. The AD 210 may establish the D2D communication connection 214 with the at least one advertisement-receiving device 212 fulfilling the predetermined criteria. It should be noted that establishing the D2D communication connection may refer to dedicated D2D communication links or to D2D multicasting/broadcasting. Consequently, the AD 210 may in steps 704 and 706 encrypt data on the basis of a currently valid security key and causing transmission of the encrypted data to the at least one advertisement-receiving device fulfilling the predetermined criteria through the D2D communication, respectively. The currently valid security key may be known by means of sequential numbering of the keys and of the validity periods, for example.

Figure 8:
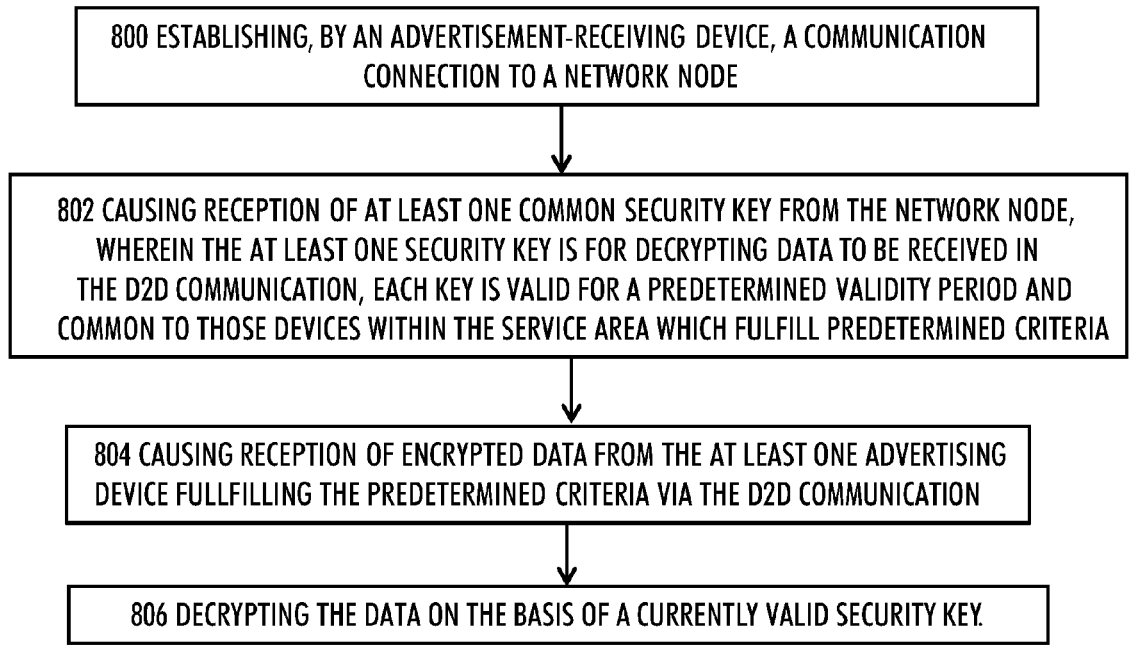

FIG. 8 illustrates a method from the advertisement-receiving device point of view. The method starts in step 800, wherein the ARD 212 locating in the service area 216 establishes a communication connection to the network node 202. In step 802, at least one common security key is received from the network node 202. The at least one security key is for encrypting at least part of the data which is to be received through the D2D communication link 214. Each security key may be valid only for a predetermined validity period and common to those at least one advertising device and at least one advertisement-receiving device within the service area 216 which fulfill the predetermined criteria, as explained earlier. The ARD 212 may establish the D2D communication connection 214 with the at least one AD 210 fulfilling the predetermined criteria. It should be noted that establishing the D2D communication connection may refer to dedicated D2D communication links or to D2D multicasting/broadcasting. Consequently, the ARD 212 may in steps 804 and 806 receive encrypted data from the at least one advertising device fulfilling the predetermined criteria through the D2D communication and decrypt the data on the basis of a currently valid security key, respectively. The currently valid security key may be known by means of sequential numbering of the keys and of the validity periods, for example.

Figure 9:
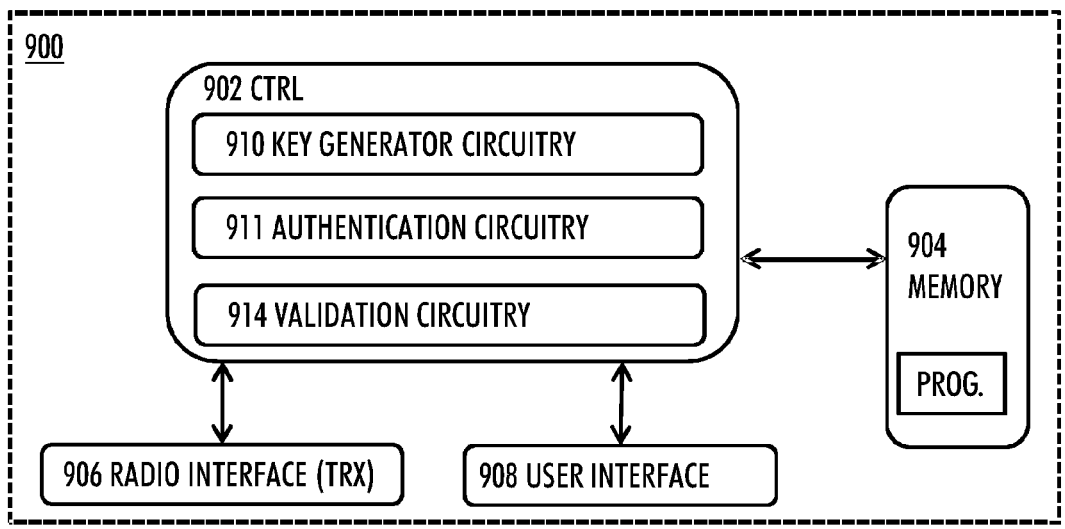
FIGS. 9 to 11 illustrate apparatus according to some embodiments.
Figure 10:
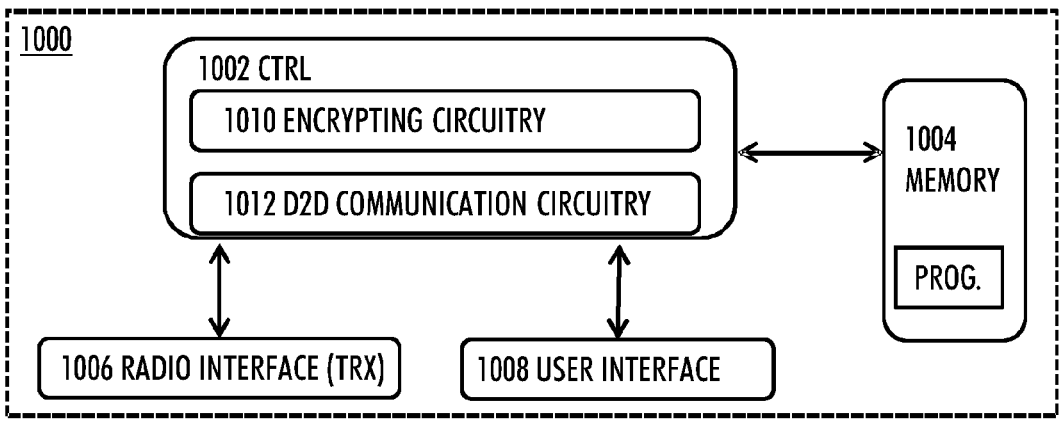
Figure 11:
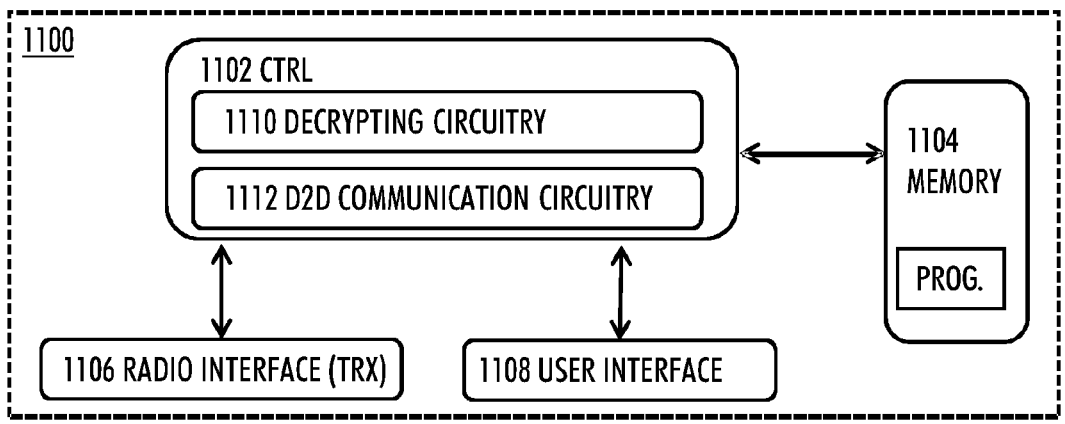

FIGS. 9 to 11 illustrate apparatuses according some embodiments. Each of the apparatuses 900, 1000, and 1100 comprises a control circuitry (CTRL) 902, 1002, 1102, such as at least one processor, and at least one memory 904, 1004, 1104 including a computer program code (PROG), wherein the at least one memory 904, 1004, 1104 and the computer program code (PROG), are configured, with the at least one processor 902, 1002, 1102, to cause the apparatus 900, 1000, 1100 to carry out any one of the embodiments described in the application. It should be noted that FIGS. 9 to 11 show only the elements and functional entities required for understanding the functions of the apparatuses. Other components have been omitted for reasons of simplicity. It is apparent to a person skilled in the art that the apparatuses may also comprise other functions and structures.

In an embodiment, the apparatus 900 of FIG. 9 may be or be comprised in a base station (also called a base transceiver station, a Node B, a radio network controller, or an evolved Node B, for example). In an embodiment the apparatus 900 is or is comprised in the network node 202/402, for example.

In another embodiment, the apparatuses 1000 and 1100 of FIGS. 10 and 11, respectively, may comprise the terminal device of a cellular communication system, e.g. a computer (PC), a laptop, a tabloid computer, a cellular phone, a communicator, a smart phone, a palm computer, or any other communication apparatus capable of cellular and direct D2D communication. Alternatively, the apparatuses 1000 and 1100 may be comprised in such a terminal device. Further, the apparatuses may be or comprise a module (to be attached to the a mobile phone) providing connectivity, such as a plug-in unit, an "USB dongle", or any other kind of unit. In an embodiment, the apparatus 1000 is or is comprised in the advertising device 210, whereas the apparatus 1100 is or is comprised in the advertisement-receiving device 212.

As said, the apparatuses 900, 1000, and 1100 may comprise a control circuitry 902, 1002, and 1102, respectively, e.g. a chip, a processor, a micro controller, or a combination of such circuitries causing the apparatus to perform any of the embodiments of the invention. Each control circuitry may be implemented with a separate digital signal processor provided with suitable software embedded on a computer readable medium, or with a separate logic circuit, such as an application specific integrated circuit (ASIC). Each control circuitry 902, 1002, and 1102 may comprise an interface, such as computer port, for providing communication capabilities. The memories 904, 1004 and 1104 may store software (PROG) executable by the at least one control circuitry 902, 1002, and 1102, respectively.

The apparatuses 900, 1000 and 1100 may comprise the memories 904, 1004, and 1104 connected to the respective control circuitry. The memories may be implemented using any suitable data storage technology, such as semiconductor based memory devices, flash memory, magnetic memory devices and systems, optical memory devices and systems, fixed memory and removable memory.

The apparatuses 900, 1000, 1100 may further comprise radio interface components (TRX) 906, 1006, 1106 providing the apparatus with radio communication capabilities with the radio access network. The radio interface components may comprise standard well-known components such as amplifier, filter, frequency-converter, (de)modulator, and encoder/decoder circuitries and one or more antennas. The radio interface components of the apparatuses 1000 and 1100 may also be applicable for the transmission and reception of data to/from the direct D2D communication links.

The apparatuses 900, 1000, and 1100 may also comprise user interfaces 908, 1008, and 1108 comprising, for example, at least one keypad, a microphone, a touch display, a display, a speaker, etc. The user interfaces may be used to control the respective apparatus by the user.

The control circuitry of the apparatus 900 may comprise a key generator circuitry 910 for generation of at least one common security key. The control circuitry 902 may also comprise authentication circuitry 911 for performing device authentication by managing the allocation of the security keys to only those devices which fulfill the predetermined criteria. The predetermined criteria may be stored in the memory 904 and the authentication circuitry 911 may select appropriate criteria from the memory 904. The criteria to be selected may informed from the network provider, for example. The circuitry 911 may also monitor the validity of the devices by analysing the reports obtained from the ARDs 212, for example. A validation circuitry 914 may be for managing the validity periods of each security key, for example. The apparatus 900 may then transmit and receive data to/from the AD 210 and/or the ARD 212 via the TRX 906. The data may relate to the security keys, reports, activation requests, activation accepts and/or rejections, D2D control information, device discovery information, multi-operator issues, etc.

The memory 904 may be for storing data related to the security keys, the validity periods of the keys, the predetermined criteria related to the devices to which the security key(s) is/are common to, identifications related to devices fulfilling the predetermined criteria, etc., for example.

The control circuitry 1002 of the apparatus 1000 may comprise an encrypting circuitry 1010 for encrypting data transmitted in the D2D communication with the currently valid security key. A D2D communication circuitry 1012 may be used for discovering and establishing communication connection with another D2D device, such as to the ARD 212, for example. The memory 1004 may be for storing data related to security keys, the security key update interval(s), the other D2D devices in the area, advertisements, etc., for example.

The control circuitry 1102 of the apparatus 1100 may comprise a decrypting circuitry 1110 for decrypting data received in the D2D communication with the currently valid security key. A D2D communication circuitry 1112 may be used for discovering and establishing communication connection with another D2D device, such as to the AD 210, for example. The memory 1104 may be for storing data related to security keys, the security key update interval(s), the other D2D devices in the area, advertisements, etc., for example.

Although not shown, each of the apparatuses 900, 1000 and 1100 may comprise a clock in order to track the update intervals of the security keys, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises processing means configure to carry out embodiments of any of the FIGS. 1 to 11. In an embodiment, the at least one processor 902, 1002, or 1102, the memory 904, 1004, or 1104, and the computer program code form an embodiment of processing means for carrying out the embodiments of the invention.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method, comprising:

establishing, by a first network node, a communication connection to at least one advertising device located in a geographically limited service area within which advertisements are transmitted from the at least one advertising device to at least one advertisement-receiving device through direct device-to-device, D2D, communication links;

establishing a communication connection to at least one advertisement-receiving device;

generating at least one security key for encrypting and decrypting at least part of the data which is to be transmitted in the D2D communication links, wherein each security key is valid for a predetermined validity period, and common to those at least one advertising device and at least one advertisement-receiving device within the service area which fulfill predetermined criteria, wherein the predetermined criteria requires at least one of the following: the device is within a certain service area, the device is served by a certain operator, the device is applying a certain type of service;

causing transmission of information indicating the generated at least one security key to those at least one advertising device which fulfill the predetermined criteria; and causing transmission of information indicating at least one of the generated at least one security key to those at least one advertisement-receiving device which fulfill the predetermined criteria.

2. The method of claim 1, further comprising:
causing reception of an activation request from the at least one advertisement-receiving device, wherein the activation request is for receiving advertisements from at least one advertising device in the service area;
determining whether to accept the request or not; and
upon accepting the request, causing transmission of information to the at least one advertisement-receiving device, wherein the information indicates control information for establishing the D2D communication link with the at least one advertising device.

3. The method of claim 1, further comprising:
causing reception of an activation request from the at least one advertisement-receiving device, wherein the activation request is for receiving advertisements from at least one advertising device in the service area;
determining whether to accept the request or not;
upon accepting the request, causing transmission of information to the at least one advertisement-receiving device, wherein the information indicates control information for establishing the D2D communication link with the at least one advertising device, and
detecting the number of advertisement-receiving devices in the service area on the basis of the number of received activation requests from the advertisement-receiving devices.

4. The method of claim 1, further comprising:
configuring a certain advertisement-receiving device to report information to the network node, wherein the information relates to an advertising device being listened to or discovered by the advertisement-receiving device;
causing reception of the information from the advertisement-receiving device; and
determining whether or not the advertising device is a valid advertising device on the basis of the received information.

5. The method of claim 1, further comprising:
causing reception of information from an advertisement-receiving device, wherein the information indicates that the advertisement-receiving device is responding to a received advertisement from a specific advertising device; and
identifying the specific advertising device on the basis of the information.

6. The method of claim 1, further comprising:
causing transmission of a plurality of security keys at least to the at least one advertising device fulfilling the predetermined criteria, wherein the plurality of security keys cover a plurality of predetermined validity periods, each security key expiring after a corresponding validity period.

7. The method of claim 1, further comprising:
causing transmission of information indicating only the current security key and the security key update interval to the at least one advertisement-receiving device fulfilling the predetermined criteria.

8. The method of claim 1, further comprising:
agreeing with a second network node, which is associated with another network operator than the first network node, that the generated at least one security key is valid for each advertising device and advertisement-receiving device in the service area regardless of whether the device is served by the first or the second network node.

9. A method, comprising:
establishing, by an advertising device located in a service area, a communication connection to a network node, wherein the service area is a geographically limited area within which advertisements are transmitted from at least one advertising device to at least one advertisement-receiving device through direct device-to-device, D2D communication links;
causing a reception of at least one common security key from the network node, wherein the at least one security key is for encrypting at least part of the data which is to be transmitted through the D2D communication links, each security key is valid for a predetermined validity period, and common to those at least one advertising device and at least one advertisement-receiving device within the service area which fulfill predetermined criteria, wherein the predetermined criteria requires at least one of the following: the device is within a certain service area, the device is served by a certain operator, the device is applying a certain type of service;
encrypting data on the basis of a currently valid security key; and
causing transmission of the encrypted data to the at least one advertisement-receiving device fulfilling the predetermined criteria through the D2D communication.

10. The method of claim 9, further comprising:
causing transmission of information to the at least one active advertisement-receiving device according to predetermined synchronization, wherein the information indicates an update of the security key for at least one next validity period.

11. The method of claim 9, further comprising:
causing transmission of information indicating the currently valid security key to the at least one active advertisement-receiving device, wherein, in addition, the security key to be used in the next validity period is ciphered with the currently valid security key.

12. A method, comprising:
establishing, by an advertisement-receiving device located in a service area, a communication connection to a network node, wherein the service area is a geographically limited area within which advertisements are transmitted from at least one advertising device to at least one advertisement-receiving device through direct device-to-device, D2D communication links;
causing reception of information indicating at least one security key from the network node, wherein the at least one security key is for decrypting at least part of the data to be received through the D2D communication links, each key is valid for a predetermined validity period, and common to those at least one advertising device and at least one advertisement-receiving device within the service area which fulfill predetermined criteria, wherein the predetermined criteria requires at least one of the following: the device is within a certain service area, the device is served by a certain operator, the device is applying a certain type of service;
causing reception of encrypted data from the at least one advertising device fulfilling the predetermined criteria through the D2D communication; and
decrypting the data on the basis of a currently valid security key.

13. The method of claim 12, further comprising:
causing transmission of an activation request to the network node wherein the activation request is for receiving advertisements from at least one advertising device in the service area.

14. An apparatus, comprising:
at least one processor and at least one memory including a computer program code, wherein the at least one memory and the computer program code are configured to, with the at least one processor, cause the apparatus at least to:
establish a communication connection to at least one advertising device located in a geographically limited service area within which advertisements are transmitted from the at least one advertising device to at least one advertisement-receiving device through direct device-to-device, D2D, communication links;
establish a communication connection to at least one advertisement-receiving device;
generate at least one security key for encrypting and decrypting at least part of the data which is to be transmitted in the D2D communication links, wherein each security key is valid for a predetermined validity period, and common to those at least one advertising device and at least one advertisement-receiving device within the service area which fulfill predetermined criteria, wherein the predetermined criteria requires at least one of the following: the device is within a certain service area, the device is served by a certain operator, the device is applying a certain type of service;
cause transmission of information indicating the generated at least one security key to those at least one advertising device which fulfill the predetermined criteria; and
cause transmission of information indicating at least one of the generated at least one security key to those at least one advertisement-receiving device which fulfill the predetermined criteria.

15. The apparatus of claim 14, wherein the apparatus is further caused to:
cause reception of an activation request from the at least one advertisement-receiving device, wherein the activation request is for receiving advertisements from at least one advertising device in the service area;
determine whether to accept the request or not; and
upon accepting the request, cause transmission of information to the at least one advertisement-receiving device, wherein the information indicates control information for establishing the D2D communication link with the at least one advertising device.

16. The apparatus of claim 14, wherein the apparatus is further caused to:
cause reception of an activation request from the at least one advertisement-receiving device, wherein the activation request is for receiving advertisements from at least one advertising device in the service area;
determine whether to accept the request or not;
upon accepting the request, cause transmission of information to the at least one advertisement-receiving device, wherein the information indicates control information for establishing the D2D communication link with the at least one advertising device, and
detect the number of advertisement-receiving devices in the service area on the basis of the number of received activation requests from the advertisement-receiving devices.

17. The apparatus of claim 14, wherein the apparatus is further caused to:
configure a certain advertisement-receiving device to report information to the network node, wherein the information relates to an advertising device being listened to or discovered by the advertisement-receiving device;
causing reception of the information from the advertisement-receiving device; and
determining whether or not the advertising device is a valid advertising device on the basis of the received information.

18. The apparatus of claim 14, wherein the apparatus is further caused to:
cause reception of information from an advertisement-receiving device, wherein the information indicates that the advertisement-receiving device is responding to a received advertisement from a specific advertising device; and
identify the specific advertising device on the basis of the information.

19. The apparatus of claim 14, wherein the apparatus is further caused to:
cause transmission of a plurality of security keys at least to the at least one advertising device fulfilling the predetermined criteria, wherein the plurality of security keys cover a plurality of predetermined validity periods, each security key expiring after a corresponding validity period.

20. The apparatus of claim 14, wherein the apparatus is further caused to:
cause transmission of information indicating only the current security key and the security key update interval to the at least one advertisement-receiving device fulfilling the predetermined criteria.

21. The apparatus of claim 14, wherein the apparatus is further caused to:
agree with a second network node, which is associated with another network operator than the apparatus, that the generated at least one security key is valid for each advertising device and advertisement-receiving device in the service area regardless of whether the device is served by the apparatus or the second network node.

22. An apparatus, comprising:
at least one processor and at least one memory including a computer program code, wherein the at least one memory and the computer program code are configured to, with the at least one processor, cause the apparatus at least to:
establish a communication connection to a network node providing coverage to a geographically limited service area within which advertisements are transmitted from the apparatus to at least one advertisement-receiving device through direct device-to-device, D2D, communication links;
cause a reception of at least one common security key from the network node, wherein the at least one security key is for encrypting at least part of the data which is to be transmitted through the D2D communication links, each security key is valid for a predetermined validity period, and common to those at least one advertising device and at least one advertisement-receiving device within the service area which fulfill predetermined criteria, wherein the predetermined criteria requires at least one of the following: the device is within a certain service area, the device is served by a certain operator, the device is applying a certain type of service;

encrypt data on the basis of a currently valid security key; and cause transmission of the encrypted data to the at least one advertisement-receiving device fulfilling the predetermined criteria through the D2D communication.

23. The apparatus of claim 22, wherein the apparatus is further caused to:
cause transmission of information to the at least one active advertisement-receiving device according to predetermined synchronization, wherein the information indicates an update of the security key for at least one next validity period.

24. The apparatus of claim 22, wherein the apparatus is further caused to:
cause transmission of information indicating the currently valid security key to the at least one active advertisement-receiving device, wherein, in addition, the security key to be used in the next validity period is ciphered with the currently valid security key.

25. An apparatus, comprising:
at least one processor and at least one memory including a computer program code, wherein the at least one memory and the computer program code are configured to, with the at least one processor, cause the apparatus at least to:
establish a communication connection to a network node providing coverage to a geographically limited service area within which advertisements are transmitted from at least one advertising device to at least one advertisement-receiving device through direct device-to-device, D2D, communication links;
cause reception of information indicating at least one security key from the network node, wherein the at least one security key is for decrypting at least part of the data to be received through the D2D communication links, each key is valid for a predetermined validity period, and common to those at least one advertising device and at least one advertisement-receiving device within the service area which fulfill predetermined criteria, wherein the predetermined criteria requires at least one of the following: the device is within a certain service area, the device is served by a certain operator, the device is applying a certain type of service;
cause reception of encrypted data from the at least one advertising device fulfilling the predetermined criteria through the D2D communication; and
decrypt the data on the basis of a currently valid security key.

26. The apparatus of claim 25, wherein the apparatus is further caused to:
causing transmission of an activation request to the network node wherein the activation request is for receiving advertisements from at least one advertising device in the service area.

* * * * *